United States Patent
Koike et al.

(10) Patent No.: US 7,213,765 B2
(45) Date of Patent: May 8, 2007

(54) COMMUNICATION MEDIUM CAPABLE OF CARRYING OUT CONTACTLESS COMMUNICATION AND METHOD OF PRODUCING THE SAME

(75) Inventors: Katsuyoshi Koike, Sendai (JP); Tsutomu Ihara, Sendai (JP); Akihiro Takahashi, Sendai (JP)

(73) Assignee: NEC Tokin Corporation, Sendai-shi (JP)

( * ) Notice: Subject to any disclaimer, the term of this patent is extended or adjusted under 35 U.S.C. 154(b) by 318 days.

(21) Appl. No.: 10/880,931

(22) Filed: Jun. 30, 2004

(65) Prior Publication Data

US 2005/0011960 A1 Jan. 20, 2005

(30) Foreign Application Priority Data

Jul. 14, 2003 (JP) ............................. 2003-274201

(51) Int. Cl.
*G06K 19/02* (2006.01)

(52) U.S. Cl. ..................... 235/488; 235/487; 235/192

(58) Field of Classification Search ................ 235/487, 235/488, 492
See application file for complete search history.

(56) References Cited

U.S. PATENT DOCUMENTS 6,568,600 B1 * 5/2003 Carpier et al. .............. 235/492
6,779,733 B2 * 8/2004 Akita et al. ................. 235/492
6,881,605 B2    4/2005 Lee et al.
2001/0011962 A1  8/2001 Fletout et al.
2004/0214364 A1 10/2004 Welling et al.

FOREIGN PATENT DOCUMENTS

DE    101 22 416 A1   11/2002
JP    2003-36433 A     2/2003
TW    523718 B         3/2003

* cited by examiner

Primary Examiner—Karl D. Frech
(74) Attorney, Agent, or Firm—Frishauf, Holtz, Goodman & Chick, P.C.

(57) ABSTRACT

In a communication medium used, for example, as an IC card or an IC tag, a metal plate is electrically connected to an antenna wire and embedded in a card base member together with the antenna wire. An IC module is also embedded in the card base member and electrically connected to the metal plate. A plurality of openings are formed in the metal plate to be opened on at least one of first and second principal surfaces defining a thickness direction of the metal plate.

15 Claims, 4 Drawing Sheets

COMMUNICATION MEDIUM CAPABLE OF CARRYING OUT CONTACTLESS COMMUNICATION AND METHOD OF PRODUCING THE SAME

This application claims priority to prior Japanese application JP 2003-274201, the disclosure of which is incorporated herein by reference.

BACKGROUND OF THE INVENTION

The present invention relates to a communication medium capable of carrying out data read/write operations in a contactless manner and a method of producing the same.

In recent years, a communication medium of a contactless system utilizing an electromagnetic wave in information exchange with various apparatuses is developed and used in various fields, for example, as an IC card or an IC tag. The communication medium of the type comprises a module for processing and recording data, and an antenna wire for transmission/reception of the data. The module and the antenna wire are embedded in a card base member made of plastic.

There is also known a combination-type communication medium which can be used both in a contact system and a contactless system. The combination type may be called a hybrid type or a composite type.

Japanese Patent Application Publication (JP-A) No. 2003-36433 discloses an example of the combination-type communication medium in which a metal plate is used so as to increase the reliability in connection between an antenna wire and an antenna connection terminal of a module. Specifically, in a state where the antenna wire is attached to the card base member, the antenna wire is connected to the metal plate. To the metal plate, the antenna connection terminal is bonded through a conductive paste. In this manner, a bonding area between the metal plate and the antenna connection terminal can be increased so that the reliability in bonding of the antenna wire is improved.

However, since the metal plate is high in heat capacity, it is problematic to use heating and pressing treatment upon production of the communication medium of the type. Specifically, during the heating and pressing treatment, heat accumulating points are concentrated to the metal plate and an area adjacent thereto. As a consequence, deviation or nonuniformity may possibly occur in thermal expansion and thermal shrinkage of the card base member to induce deformation of the card base member.

SUMMARY OF THE INVENTION

It is therefore an object of the present invention to provide a communication medium which is high in reliability of bonding of an antenna wire and which can be produced by the use of heating and pressing treatment without difficulty or trouble.

It is another object of the present invention to provide a method of producing a communication medium, which allows the use of heating and pressing treatment by suppressing deformation of a card base member.

Other objects of the present invention will become clear as the description proceeds.

According to an aspect of the present invention, there is provided a communication medium comprising a card base member, an antenna wire embedded in the card base member, a module embedded in the card base member, and a metal plate embedded in the card base member and electrically connected to the antenna wire and the module, the metal plate having a plurality of openings opened on at least one of first and second principal surfaces defining a thickness direction of the metal plate.

According to another aspect of the present invention, there is provided a method of producing a communication medium, the method comprising placing an antenna wire on an intermediate sheet of amorphous copolyester, sandwiching, from opposite sides of the intermediate sheet, the intermediate sheet and the antenna wire by first and second sheets each of which is made of a polyethylene terephthalate material having opposite surfaces coated with amorphous copolyester, carrying out heating and pressing treatment to integrally combine the first, the second, and the intermediate sheets to obtain an integral single-piece sheet, boring the integral single-piece sheet to form a depressed portion allowing a specific part of the antenna wire to be exposed, and electrically connecting an antenna connection terminal of a module to the specific part of the antenna wire by fitting the module to the depressed portion.

DESCRIPTION OF PREFERRED EMBODIMENTS

Referring to FIGS. 1 to 4, description will be made of a communication medium according to an embodiment of the present invention, together with a method of producing the same. The communication medium illustrated in the figure is a combination-type IC card having both of contactless and contact communication functions and including a card base member 1 and a module 2 coupled to the card base member 1. The module 2 has an IC (integrated circuit) element or the like and, therefore, will be called hereunder an IC module 2.

Figure 1:
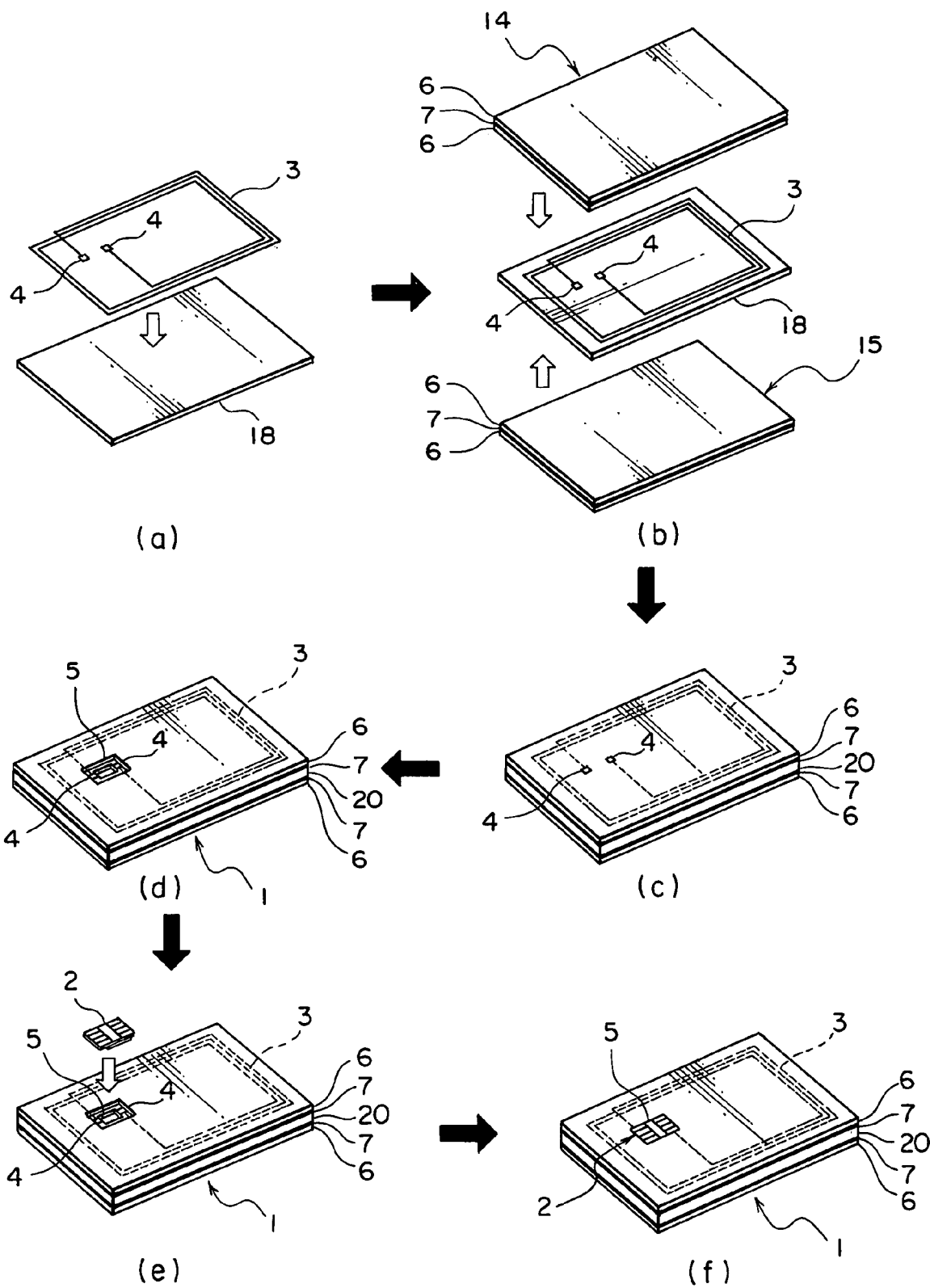
FIG. 1 is a view for describing a production process of a communication medium according to an embodiment of the present invention.
Figure 2:
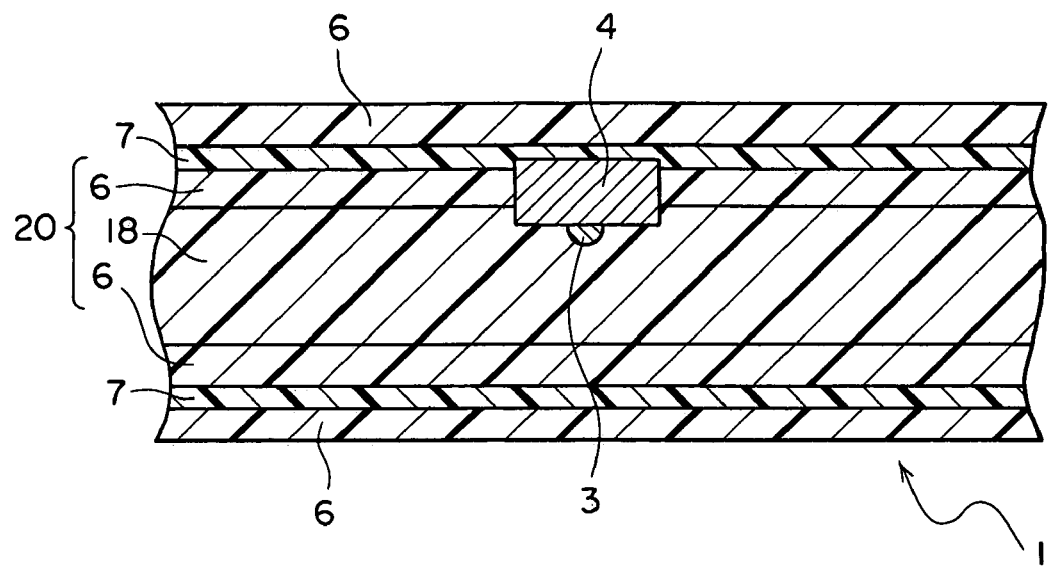
FIG. 2 is an enlarged sectional view of the communication medium in a step (c) in FIG. 1.

FIG. 1 illustrates first through sixth steps (a)–(f) of producing the combination-type IC card. In the first step (a) of FIG. 1, a coated metal wire is shaped into a loop to form an antenna wire, i.e., an antenna coil 3. Squeezing is applied to opposite end portions of the antenna coil 3 in a radial direction thereof to form squeezed flat portions at the opposite end portions. To the squeezed flat portions, two metal plates 4 are adhered and fixed by spot welding, respectively. The antenna coil 3 and the metal plates 4 are disposed on an intermediate sheet 18 made of PET-G (Registered Trademark) as an amorphous copolyester material in the manner such that the metal plates 4 are spaced from each other. The antenna coil 3 and the metal plates 4 are adhered to the intermediate sheet 18. A space between the metal plates 4 is designed in conformity with an external dimension of the IC module 2.

Turning to the second step (b) of FIG. 1, the intermediate sheet 18 with the antenna coil 3 and the metal plates 4 held thereon is sandwiched between first and second hybrid sheets 14 and 15 from upper and lower sides to form a sheet laminate body. Each of the first and the second hybrid sheets 14 and 15 comprises a sheet substrate 7 made of polyethylene terephthalate (PET) and coating films 6 made of PET-G (Registered Trademark) as an amorphous copolyester material and formed on upper and lower surfaces of the sheet substrate 7. Each of the first and the second hybrid sheets 14 and 15 has a thickness of about 70 μm.

Turning to the third step (c) of FIG. 1, the sheet laminate body is subjected to heating and pressing treatment such as heat pressing or hot pressing known in the art. So that, a whole of the sheet laminate body has a predetermined thickness. Thus, the intermediate sheet 18 and the first and the second hybrid sheets 14 and 15 are heat-welded to form an integral single-piece sheet. As each of the intermediate sheet 18 and the coating films 6 is made of PET-G, the intermediate sheet 18 and the first and the second hybrid sheets 14 and 15 can easily be heat-welded by the heating and pressing treatment.

In the heat pressing, the intermediate sheet 18 and the coating films 6 adjacent to opposite surfaces of the intermediate sheet 18 are integrally combined into an intermediate layer 20 made of amorphous copolyester. As a result, in the integral single-piece sheet shown in FIG. 2 also, the intermediate layer 20 made of amorphous copolyester is provided between the sheet substrates 7. Inside the integral single-piece sheet, the antenna coil 3 and the metal plates 4 are embedded. Each of the squeezed portions of the antenna coil 3 is of a substantially semicircular shape as clearly shown in FIG. 2.

Turning to the fourth step (d) of FIG. 1, the integral single-piece sheet is cut into a predetermined card size. Further, the integral single-piece sheet is subjected to boring at a predetermined position, i.e., a position corresponding to an area including the two metal plates 4 to form a depressed portion 5 allowing the metal plates 4 to be exposed. The boring may be carried out by a laser beam or by mechanical grinding using, for example, a milling machine. Thus, the card base member 1 is formed. Since the card base member 1 comprises the sheet substrates 7 made of PET and having high heat resistance, overall heat resistance of the card base member 1 is improved as compared with a card base member made of amorphous copolyester alone. The card base member 1 has opposite surfaces formed by amorphous copolyester excellent in workability. Therefore, surface treatment or processing such as embossing can be easily carried out without any trouble.

Figure 3:
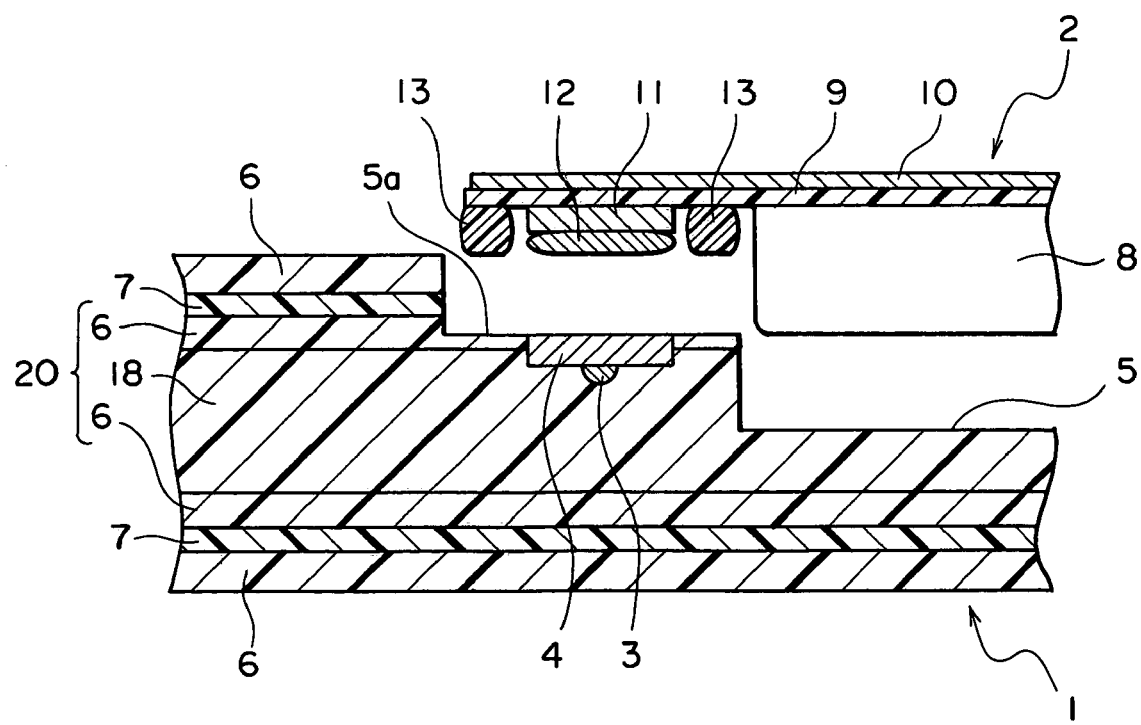
FIG. 3 is an enlarged sectional view of the communication medium in a step (e) in FIG. 1.

Turning to the fifth step (e) of FIG. 1, the IC module 2 is faced to the depressed portion 5 of the card base member 1. As illustrated in FIG. 3, the IC module 2 comprises a module substrate 9, a mold portion 8 formed on a lower surface of the module substrate 9, a pair of antenna connection terminals 11 (only one of which is depicted in FIG. 3) formed on the lower surface of the module substrate 9, and a contact terminal 10 formed on an upper surface of the module substrate 9. The mold portion 8 contains the IC element molded by resin. Before the IC module 2 is fitted to the depressed portion 5, a paste-like solder as a bonding member 12 is preliminarily applied onto a bonding surface of each of the antenna connection terminals 11. On a bonding surface of the module substrate 9, a thermosetting tape 13 as a thermosetting adhering member is attached. Depending upon the variation in amount of the tape 13 attached to the bonding surface or the variation in heat pressing condition, the thermosetting tape 13 may partially protrude from a gap in the depressed portion 5 onto the surface of the card base member 1. However, if a white or a transparent tape is used as the thermosetting tape 13, the tape 13 is not conspicuous even if the tape 13 is partially protruded. Thus, a problem in appearance can be avoided. The depressed portion 5 has a specific surface 5a faced to the antenna connection terminals 11. The metal plates 4 are embedded in the card base member 1 to be flush with the specific surface 5a.

Figure 4:
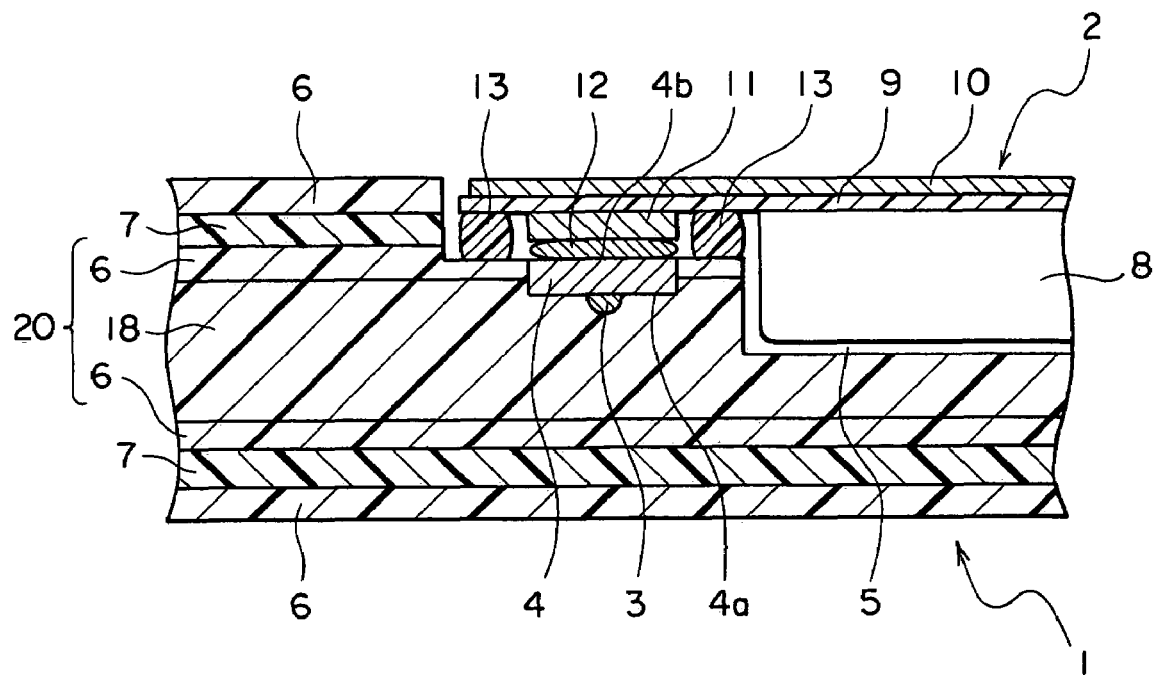
FIG. 4 is an enlarged sectional view of the communication medium in a step (f) in FIG. 1.

Finally referring to the sixth step (f) of FIG. 1, the IC module 2 is fitted to the depressed portion 5 by a so-called facedown technique and the heating and pressing treatment is carried out. The state where the IC module 2 is fitted to the depressed portion 5 is shown in FIG. 4 also. As a result of the heating and pressing treatment, the antenna connection terminals 11 of the IC module 2 are electrically connected to the metal plates 4 by the connecting member 12. Simultaneously, the module substrate 9 of the IC module 2 is adhered and fixed to the card base member 1 by the thermosetting tape 13. The contact terminal 10 serves to contact an external card reader (not shown) to carry out information exchange.

During the heating and pressing treatment, heat is locally accumulated at a peripheral part of the IC module 2, particularly, in the metal plates 4. Therefore, the card base member 1 is susceptible to thermal damage therearound. Taking this into consideration, each of the metal plates 4 is designed in the manner which will presently be described.

Figure 5:
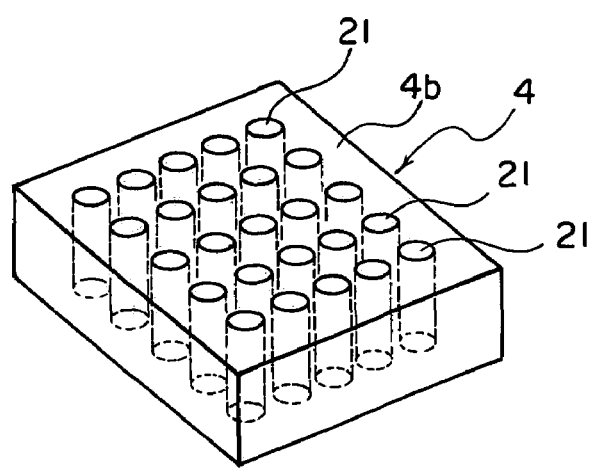
FIG. 5 is a perspective view of a metal plate included in the communication medium produced according to the method described in conjunction with FIG. 1.

Referring to FIG. 5 in addition to FIG. 4, a specific example of the metal plate 4 will be described.

The metal plate 4 has a plurality of openings or holes 21. The holes 21 are disposed in a matrix fashion and in parallel to one another. Each of the holes 21 is a through hole having a diameter of about 200 μm and extending between a lower surface and an upper surface, i.e., a first principal surface 4a and a second principal surface 4b defining a thickness direction of the metal plate 4 to be perpendicular to the first and the second principal surfaces 4a and 4b. As the hole 21, a bottomed hole may be used instead of the through hole. At any rate, the opening or the hole 21 is opened on at least one of the first and the second principal surfaces 4a and 4b.

The antenna coil 3 is kept in contact with the first principal surface 4a of the metal plate 4 and extends along the first principal surface 4a. On the other hand, each of the antenna connection terminals 11 of the IC module 2 is faced to the second principal surface 4b of the metal plate 4.

In order to facilitate an understanding, the holes 21 are schematically expressed as regularly-aligned holes in FIG. 5. Practically, however, the holes 21 are formed in the metal plate 4 so as to avoid a part facing the end of the antenna coil 3. The number and the arrangement of the holes 21 are not limited to those in the illustrated example.

The metal plate 4 having the above-mentioned structure is reduced in heat capacity by an amount corresponding to reduction in volume and therefore has an effect of suppressing the above-mentioned thermal damage upon the card base member 1.

The bonding member 12 preliminarily applied to each of the antenna connection terminals 11 enters into the holes 21 of the metal plate 4 when the IC module 2 is fitted to the depressed portion 5. As a result, the contact area between the metal plate 4 and the bonding member 12 is increased. Therefore, an increase in bonding strength is expected. The metal plate 4 may be made of any desired material. However, taking the affinity with the solder into consideration, the material of the metal plate 4 is preferably selected from Cu, Ni, Ag, and Au. As the bonding member 12, a conductive paste may be used.

Figure 6A:
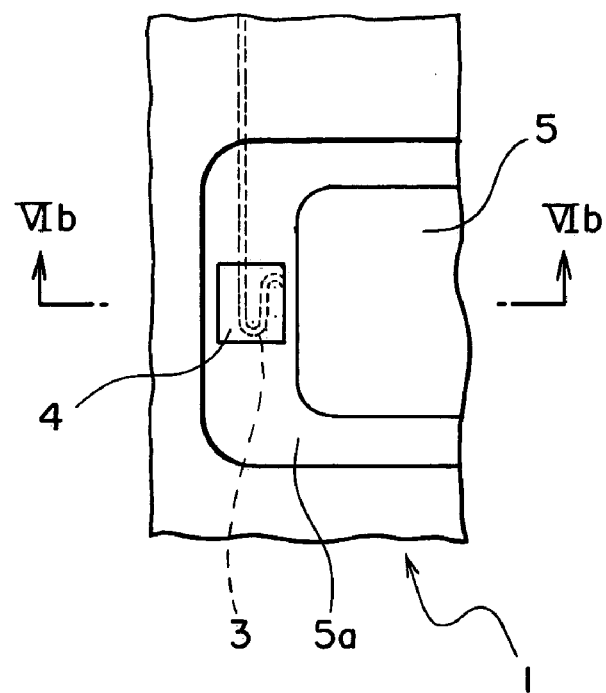
FIG. 6A is a plan view of a primary portion of a card base member included in a communication medium according to another embodiment of the present invention.
Figure 6B:
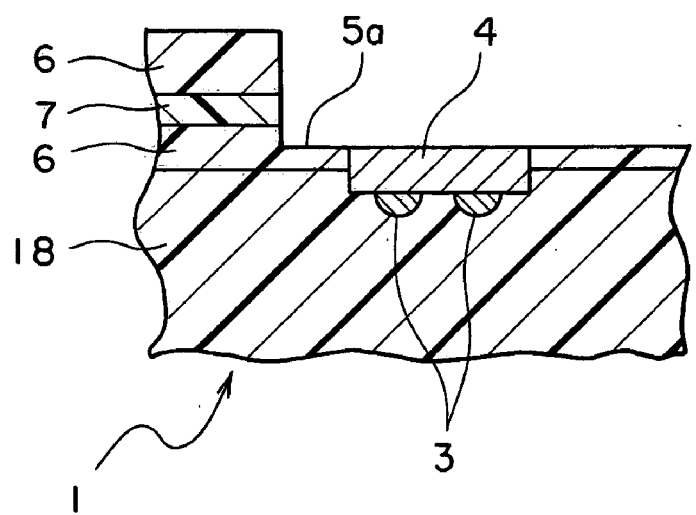
FIG. 6B is a sectional view taken along a line VIb—VIb of FIG. 6A.

Referring to FIGS. 6A and 6B, description will be made of a communication medium according to another embodiment of the present invention. Similar parts or portions are designated by like reference numerals.

In the communication medium, each of the end portions of the antenna coil 3 is formed to meander along a substantial zigzag line. In this structure, each of the metal plates 4 comes into contact with a long portion or plural portions of the antenna coil 3. Therefore, it is possible to raise a reliability of connection between the antenna coil 3 and each of the metal plates 4.

While the present invention has thus far been described in connection with the preferred embodiments thereof, it will readily be possible for those skilled in the art to put this invention into practice in various other manners. For example, although description has been made as regards the combination-type IC card in the foregoing embodiment, the present invention is not limited thereto. Namely, the present invention is applicable to an IC tag similar to the IC card or any information communication medium, such as an optical medium, a magnetic medium, a dielectric medium, or a composite medium as a combination thereof, which has a card-like, a sheet-like, a label-like, or any appropriate shape.

What is claimed is:

1. A communication medium comprising:
   a card base member;
   an antenna wire embedded in said card base member;
   a module embedded in said card base member; and
   at least one metal plate embedded in said card base member and electrically connected to said antenna wire and said module, said metal plate having a plurality of openings opened on at least one of first and second principal surfaces at opposite sides of said metal plate in a thickness direction thereof.

2. The communication medium according to claim 1, wherein each of said openings comprises a through hole extending between said first and second principal surfaces and penetrating through said metal plate.

3. The communication medium according to claim 1, wherein said antenna wire comprises a metal wire connected to said metal plate.

4. The communication medium according to claim 3, wherein said metal wire extends along said first principal surface in contact with said first principal surface.

5. The communication medium according to claim 1, wherein said module comprises an antenna connection terminal connected to said metal plate.

6. The communication medium according to claim 5, wherein said antenna connection terminal is faced to said second principal surface of said metal plate.

7. The communication medium according to claim 6, further comprising a connecting member connecting said antenna connection terminal to said metal plate.

8. The communication medium according to claim 1, further comprising a thermosetting adhering member adhering said module to said card base member.

9. The communication medium according to claim 1, wherein said card base member comprises a depressed portion that accommodates said module, said depressed portion has a surface faced to said antenna connection terminal, and said metal plate is embedded in said card base member to be flush with said surface of said depressed portion faced to said antenna connection terminal.

10. The communication medium according to claim 1, wherein said metal plate is made of a material selected from the group consisting of Cu, Ni, Ag, and Au.

11. The communication medium according to claim 1, wherein said card base member comprises:
   first and second sheets, each of which comprises a sheet made of polyethylene terephthalate having opposite surfaces thereof coated with amorphous copolyester; and
   an intermediate sheet which is disposed between said first and said second sheets and made of amorphous copolyester; and
   wherein said antenna wire is disposed between said first and said second sheets, and said first, second, and intermediate sheets are integrally combined by heating and pressing treatment.

12. A method of producing a communication medium, said method comprising:
   placing an antenna wire on an intermediate sheet of amorphous copolyester;
   sandwiching, from opposite sides of said intermediate sheet, said intermediate sheet and said antenna wire with first and second sheets, each of said first and second sheets comprising a sheet of a polyethylene terephthalate material having opposite surfaces thereof coated with amorphous copolyester;
   carrying out heating and pressing treatment to integrally combine said first, second, and intermediate sheets to obtain an integral single-piece sheet;
   boring said integral single-piece sheet to form a depressed portion so as to expose a part of said antenna wire;
   connecting to said part of said antenna wire, a metal plate having a plurality of openings opened on at least one of first and second principal surfaces at opposite sides of said metal plate in a thickness direction thereof; and
   electrically connecting an antenna connection terminal of a module to said part of said antenna wire by fitting said module to said depressed portion so as to be connected to the metal plate.

13. The method according to claim 12, further comprising fixing said module to said integral single-piece sheet by a thermosetting tape.

14. The method according to claim 13, wherein said thermosetting tape is white.

15. The method according to claim 13, wherein said thermosetting tape is transparent.

* * * * *